July 23, 1935.　　　C. H. L. FLINTERMANN　　　2,009,045
METHOD OF MAKING VALVES
Filed Jan. 30, 1932
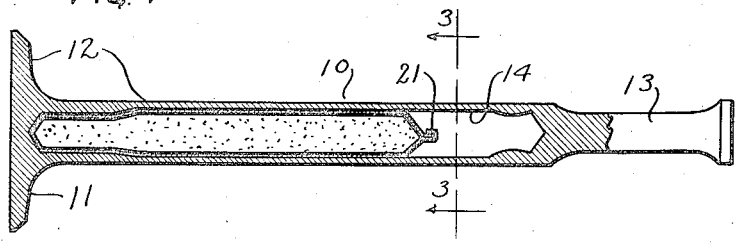
Fig. 1
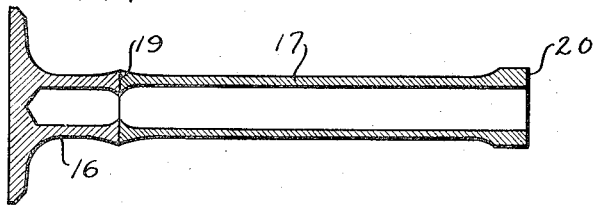
Fig. 2
Fig. 3
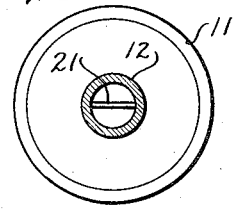
Fig. 4
Inventor
Carl H. L. Flinterman, dec'd
Union Guardian Trust Co.
administrator
By Maréchal & Noé
Attorney Patented July 23, 1935

2,009,045

UNITED STATES PATENT OFFICE 2,009,045

METHOD OF MAKING VALVES

Carl H. L. Flintermann, deceased, late of Birmingham, Mich., by Union Guardian Trust Company, Detroit, Mich., administrator, assignor to Wilcox-Rich Corporation, Detroit, Mich., a corporation of Michigan Application January 30, 1932, Serial No. 589,790

2 Claims. (Cl. 29—156.7)

This invention relates to engine valves or the like, and more particularly to valves containing a quantity of cooling material which is a liquid at the normal operating temperature of the valve.

One object of the invention resides in the method of making a valve for engines and the like, in which a capsule of cooling material is inserted into the hollow valve stem and sealed therein, the valve being then heated so as to destroy the capsule.

Another object of the invention is the provision of a capsule for use in a hollow valve, the capsule entirely enclosing and being substantially full of a quantity of material which is readily affected by air or moisture, and being formed of a normally solid material of such character that the capsule will be destroyed when subjected to a high heat.

Other objects and advantages of the invention will be apparent from the following descripion, the appended claims and the accompanying drawing, in which—

Fig. 1 is a longitudinal section of a valve embodying the present invention;

Fig. 2 shows a partially formed valve, in section;

Fig. 3 is a section on the line 3—3 of Fig. 1; and

Fig. 4 is a view of a capsule of cooling material.

Referring more particularly to the drawing by reference numerals, like numerals designate similar parts in the various views, 10 designates generally a valve member shown in the ordinary poppet valve form and comprising a head 11, stem 12 and valve tip 13. The valve stem is hollow so as to provide an interior space 14 which contains a quantity of cooling material adapted to transfer heat from the head end of the valve toward the stem end in the manner more fully explained in Patent No. 1,670,965, dated May 22, 1928.

The valve member may be formed of a plurality of sections, welded together so as to provide an integral entirety. For example the valve may comprise the partly drilled out head portion 16, the tube 17 and the stem end portion 13. The ends of the tube 17 are preferably of enlarged thickness so that welds of substantial area may be formed where these ends are joined to the ends of the two end sections at the points 19 and 20. The ends of the two end sections may also be of enlarged diameter before the welding operation is effected, and after the sections are welded together the enlargements provided at the points 19 and 20 on the outside of the valve wall may be swaged so as to partially close in the walls to provide an increased area of weld on the inside. The head end of the valve is welded first to the stem portion 17 and after the outside material is swaged so as to put an increased area of weld on the inside, the inside of the valve may, if desired, be drilled out so as to remove the inwardly projecting part of the weld.

Before the stem end portion 13 is welded to the other end of the stem tube 17 the cooling material is inserted into the hollow chamber. This cooling material may be metallic sodium or a mixture of readily meltable metals of like character, or may be a suitable cooling salt such as a mixture of potassium nitrate and lithium nitrate. Potassium nitrate and lithium nitrate absorb moisture very readily, and metallic sodium readily catches fire in air at ordinary temperatures. In order to permit the cooling medium to be readily handled and applied to the interior of the valve, it is prepared in a capsule or container. These capsules of sodium or cooling salts may be prepared in advance in any desired quantity and readily stored until they need to be used, as the capsule or container protects the contents from air and moisture. The capsules are sealed full of the cooling material so as to entirely protect the cooling material from air and moisture, but the capsules are so made that they do not exist, as such, in the valve after the valve has been completed and is ready for use. The material forming the container or capsule is of such character that the capsule will be destroyed either by fusing before the valve is ready for use, at some comparatively high temperature or be destroyed by the expansive effect of the sodium or the salt when a comparatively high temperature is obtained. For example, the capsule container may be formed of copper, aluminum, or some other similar metal so that the capsule will be burst at a temperature of several hundred degrees Fahrenheit. The capsule, being substantially entirely full of the salt or sodium which has a comparatively high rate of expansion, cannot withstand the large expansion of its contents at comparatively high temperatures, and will burst, the capsule being quite considerably smaller than the interior chamber in the valve so the valve can not hold the container against the bursting effect. However, if desired, the capsule material may be of lead or tin foil, both having fusing points below 700° F., or may be of non-metallic character and formed of such material as rubber or a cellulose base composition such as commercial cellophane or the like. A capsule formed of such material will be destroyed or fused at temperatures of several hundred degrees Fahrenheit so as to release the cooling material in order that it may be thrown from one end of the valve chamber to the other and transfer heat from the hotter head end of the valve to the stem portion. When sodium is used the metallic sodium rods of suitable length may be dipped in rubber or other protective material to form an enclosing casing sealing the sodium from the action of air and moisture and forming a capsule adapted to be readily inserted and which may be formed in any desired quantity at convenient times and stored until they need to be used.

The use of a capsule to enclose the metallic sodium or other cooling medium employed lends itself admirably for X-ray purposes in order that the amount of cooling medium within a valve can be determined as a check against leakage for example. The lead, for example, of the capsule will be mixed or combined with the cooling medium itself and the use of an X-ray determines the height of the column of cooling medium although it might not be able to determine the pure cooling medium without the additional substance of higher molecular weight.

After the valve parts are welded together the valves are subjected to a heat treatment of about 1500° F. so as to normalize the welds and this heat treatment destroys the capsule either by fusing the substance of which the capsule or container is formed, or destroying it by the expansive effect of the cooling material contained therein. After the weld normalizing step, the valve is preferably quenched and the valve stem end drawn to obtain the desired hardness.

As shown in Figs. 1 and 4 the capsule is a round tube of such diameter as to be readily placed within the hollow space in the valve stem. The length of the capsule is preferably about ¾ of the length of the valve chamber. The end 21 of the capsule is bent over and sealed after the cooling salt or sodium is inserted so that the cooling material is sealed from air and moisture. Preferably the capsule is just a little smaller in diameter than the interior chamber of the valve so the capsule may be dropped readily into the valve stem opening. However, when the end of the stem is closed and the valve is heated to a high temperature, above that ever given to it in use, the copper, aluminum or other metallic sides of the capsule are forced out under considerable force into intimate contact with the sides of the valve chamber before the capsule bursts out at the end, due to the expansion of the contained cooling medium.

It will now be apparent that in accordance with the present invention, the salt or sodium or like material used as a cooling agent for a hollow valve may be readily handled and may be prepared in capsule form long in advance of the time of insertion into the valve member in which it is sealed. However, before the valve is used, the heat treating operation to which it is subjected destroys the capsule, leaving the cooling material partially filling the hollow chamber of the valve so that it can readily flow from one end of this chamber to the other and transfer heat from the valve head to the valve stem portion.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A method of making a valve comprising forming a valve member with a hollow stem portion, inserting a closed capsule full of cooling material which is readily affected by air or moisture and which is a liquid at the normal working temperatures of the valve, sealing the closed capsule in the hollow stem portion, and heating the valve so as to destroy the capsule.

2. The method of making an engine valve comprising forming a valve member with a hollow stem portion, inserting a closed metal capsule of cooling material which is readily affected by air or moisture and which is a liquid at the normal working temperatures of the valve, sealing the closed capsule in the hollow stem portion, and heating the valve to the melting point of the capsule material to destroy the capsule.

UNION GUARDIAN TRUST COMPANY,
*Administrator of the Estate of Carl H. L. Flintermann, Deceased,*
By R. E. HOFELICH,
*Vice-President.*